United States Patent [19]

Nagaoka et al.

[11] Patent Number: 5,016,359
[45] Date of Patent: May 21, 1991

[54] LINEAR SCALE ARRANGEMENT

[75] Inventors: Kazuo Nagaoka; Tadao Hatano; Sadao Wakabayashi; Takamitsu Shimizu, all of Tokyo, Japan

[73] Assignee: Sony Magnescale Inc., Tokyo, Japan

[21] Appl. No.: 357,943

[22] Filed: May 30, 1989

[30] Foreign Application Priority Data

| May 31, 1988 | [JP] | Japan | 63-72638[U] |
| May 31, 1988 | [JP] | Japan | 63-133032 |
| Jun. 9, 1988 | [JP] | Japan | 63-142278 |
| Jun. 9, 1988 | [JP] | Japan | 63-142279 |
| Jul. 8, 1988 | [JP] | Japan | 63-90842[U] |

[51] Int. Cl.⁵ .................. G01B 7/14; G01B 11/04
[52] U.S. Cl. .......................... 33/702; 33/706; 33/708; 33/645
[58] Field of Search ............... 33/702, 703, 704, 705, 33/706, 707, 708, 712, 645

[56] References Cited

U.S. PATENT DOCUMENTS

| 3,975,100 | 8/1976 | Taylor | 356/106 |
| 4,031,595 | 6/1977 | Welker | 33/707 |
| 4,198,757 | 4/1980 | Nelle et al. | 33/125 |
| 4,320,578 | 3/1982 | Ernst | 33/125 |
| 4,530,157 | 7/1985 | Nelle | 22/125 |
| 4,549,354 | 10/1985 | Affa et al. | 33/125 |
| 4,649,648 | 3/1989 | Nagaoka | 33/125 |
| 4,843,729 | 7/1989 | Nagaoka et al. | 33/708 |

FOREIGN PATENT DOCUMENTS

2941205 7/1981 Fed. Rep. of Germany .
3527652 6/1986 Fed. Rep. of Germany .

Primary Examiner—Thomas B. Will
Attorney, Agent, or Firm—Ronald P. Kananen

[57] ABSTRACT

A scale arrangement is designed for monitoring relative displacement between first and second members. The scale arrangement comprises an elongated scale having end portions at both ends thereof, a pair of receptacles respectively receiving the end portions, a hollow member receiving the scale therein, the hollow member being formed into essentially quadrate cross section, a head slidingly mounted on the scale for axial movement therealong for reading scale to generate a read scale indicative signal, a head slider associated with the head for axial movement with the head, the end portions, the receptacles and the head sliders being positioned on respectively associated one of first and second members with respect to the end portions, position of the head slider being determined with respect to a reference plane set on the outer peripheral plane on the hollow member in relation to the end portion.

8 Claims, 9 Drawing Sheets

LINEAR SCALE ARRANGEMENT

BACKGROUND OF THE INVENTION

1. Field of the Invention

The present invention relates generally to a linear scale arrangement for measuring relative position and/or magnitude of relative displacement of objects, such as work and machine tool and so forth.

2. Description of the Background Art

U.S. Pat. No. 4,843,729, filed on Aug. 18, 1987, which has been assigned to the common assignee to the present invention, discloses a mounting structure for a linear scale which includes an elongated scale with essentially cylindrical end members. The end members are aligned with the scale with high accuracy. The mounting structure includes a mount block to be rigidly secured onto a plane of one of the object. The end members are mounted on the mount block. Projection means is provided between the end member and the mount block so as to permit pivotal motion of the end members with the scale relative to the mount block during installation so as to allow fine adjustment for obtaining parallerism of the scale axis with an axis of relative motion of the objects.

The disclosed arrangement further includes a scale channel defining an internal space through which the scale extends. The scale channel serves for protecting the scale from the environmental dust and so forth. Furthermore, the scale channel serves as magnetic shield, in case that the scale is a magnetic scale.

With the prior proposed construction, the scale channel is not required substantial accuracy in production because the scale can be installed with high accuracy of parallerism relative to the motion axis of the objects.

Practically, the scale as assembled is covered with the scale channel in dust-proofing fashion. Therefore, upon installation to the objects, it is not possible to visually observe or mechanically and directly access the scale for adjusting the orientation of the scale axis. Therefore, it is common practice to provide a reference plane on the scale channel defined between an alignment marks put on the outer surface of the scale channel. The reference plane is guaranteed to be parallel to the scale.

In such prior proposed scale arrangement, a difficulty has been encountered in providing the alignment marks with satisfactory level of accuracy.

SUMMARY OF THE INVENTION

Therefore, it is an object of the present invention to provide a linear scale arrangement which can be easily manufactured with holding satisfactory level of accuracy when it is installed on objects for which the relative position or relative displacement is to be measured.

According to one aspect of the invention, a scale arrangement for monitoring relative displacement between first and second members, comprises:

an elongated scale having end portions at both ends thereof;

a pair of receptacles respectively receiving the end portions;

a hollow member receiving the scale therein, the hollow member being formed into essentially quadrate cross section;

a head slidingly mounted on the scale for axial movement therealong for reading scale to generate a read scale indicative signal;

a head slider associated with the head for axial movement with the head;

the end portions, the receptacles and the head sliders being positioned on respectively associated one of first and second members with respect to the end portions, position of the head slider being determined with respect to a reference plane set on the outer peripheral plane on the hollow member in relation to the end portion.

The hollow member may comprises an inner and outer members respectively having essentially quadrate cross-section, the first sectionally quadrate members has an outer periphery opposing to the inner periphery of the second quadrate member, a bias means is provided between the inner and outer members for biasing the inner member toward the outer member for forming the reference plane on the outer member. The bias means may comprise a leaf spring acting on one corner of the inner member for exerting biasing forces in mutually perpendicular two directions toward the outer member.

The hollow member may be formed with a plurality of longitudinally aligned projections, the tip ends of the projections are oriented on the reference plane extending in parallel to the scale.

The scale arrangement further comprises a jig which is releasably mounted on the hollow member and resiliently biased toward the reference plane, the jig being movable in longitudinal direction, and a connecting member for connecting the head slider to one of the first and second members, which connecting member is positioned with respect to the jig. In the alternative, the scale arrangement may further comprises a jig mating with two reference planes formed on the hollow member and means for biasing the jig onto respective of the two reference planes, and a connecting member for connecting the head slider to one of the first and second members, which connecting member is positioned with respect to reference portion formed by the jig. The head slider is formed with one of projection and recess, a connecting member for connecting the head slider to one of the first and second members, which connecting member is formed with one of recess and projection conforming with the one of projection and recess formed in the head slider, and a jig which is resiliently biased onto the reference plane on the hollow member, by means of which the position of the connecting member on one of the first and second member is determined.

The scale arrangement further comprises a head slider holder which comprises a positioning section to be attached onto the hollow member, a hooking section for biasing the positioning section to the hollow member and connected to the positioning section by a web portion made of a flexible material, and a holder section for holding the head slider. The positioning section, a hooking section and holder section are formed integrally of a flexible material.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment, but are for explanation and understanding only.

In the drawings:

FIGS. 5 and 6 are respectively front and side elevations of machine tool which performs machining for adjusting alignment mark heights in practical alignment marking operation, in which FIG. 6 is a section taken along line VI—VI of FIG. 5;

DESCRIPTION OF THE PREFERRED EMBODIMENT

Figure 1:
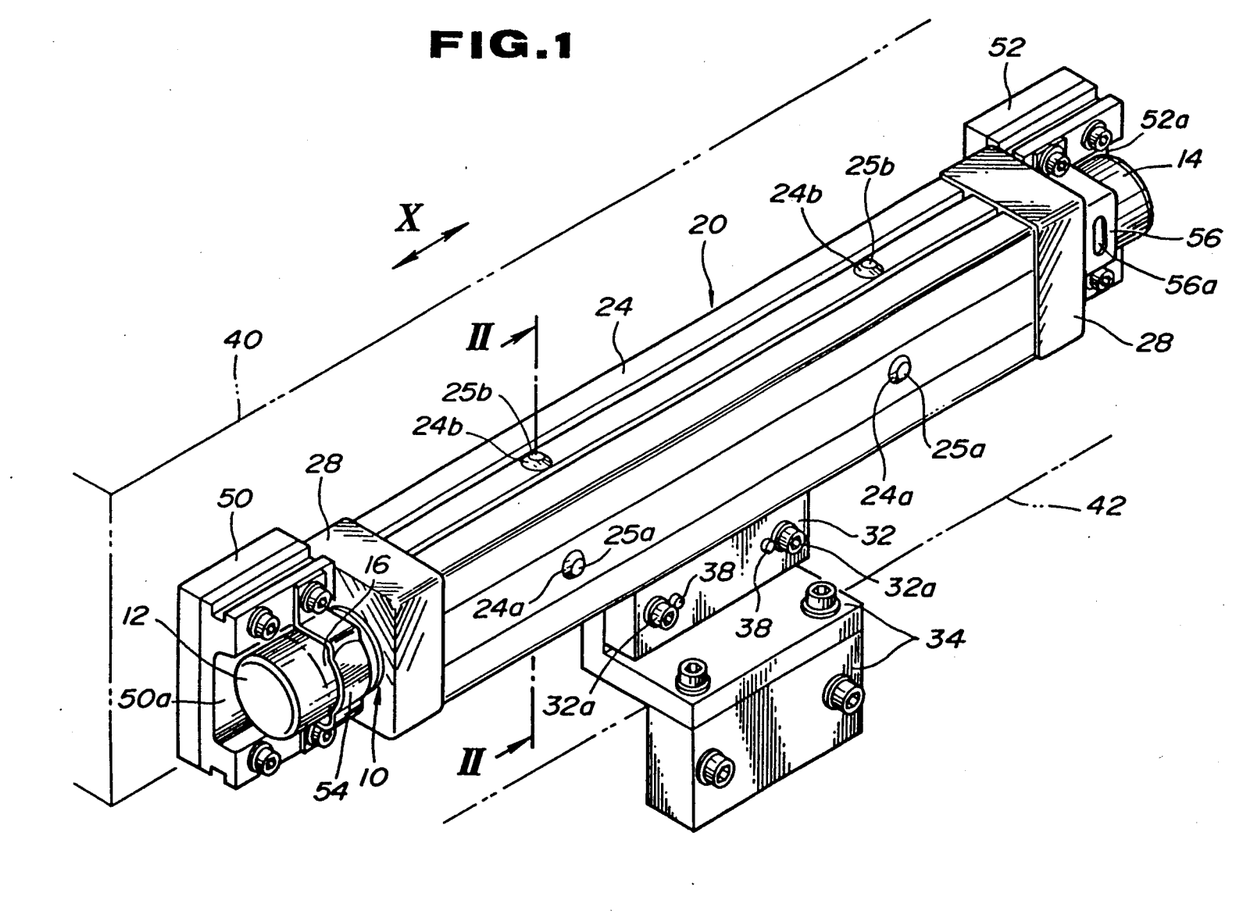
FIG. 1 is a perspective view of the preferred embodiment of a linear scale arrangement according to the present invention.
Figure 2:
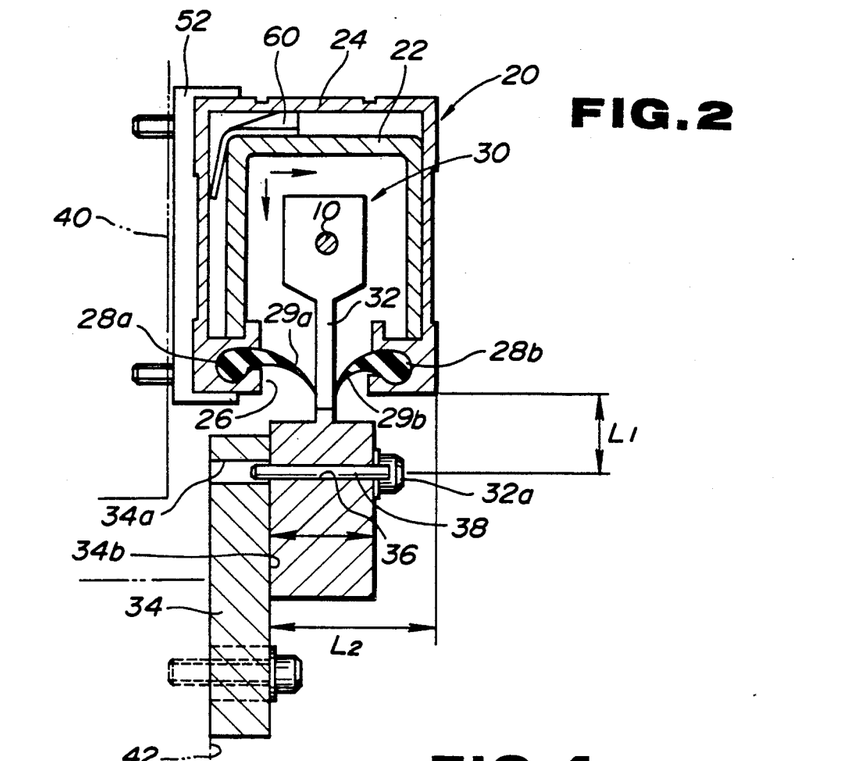
FIG. 2 is a section taken along line II—II of FIG. 1.
Figure 3:
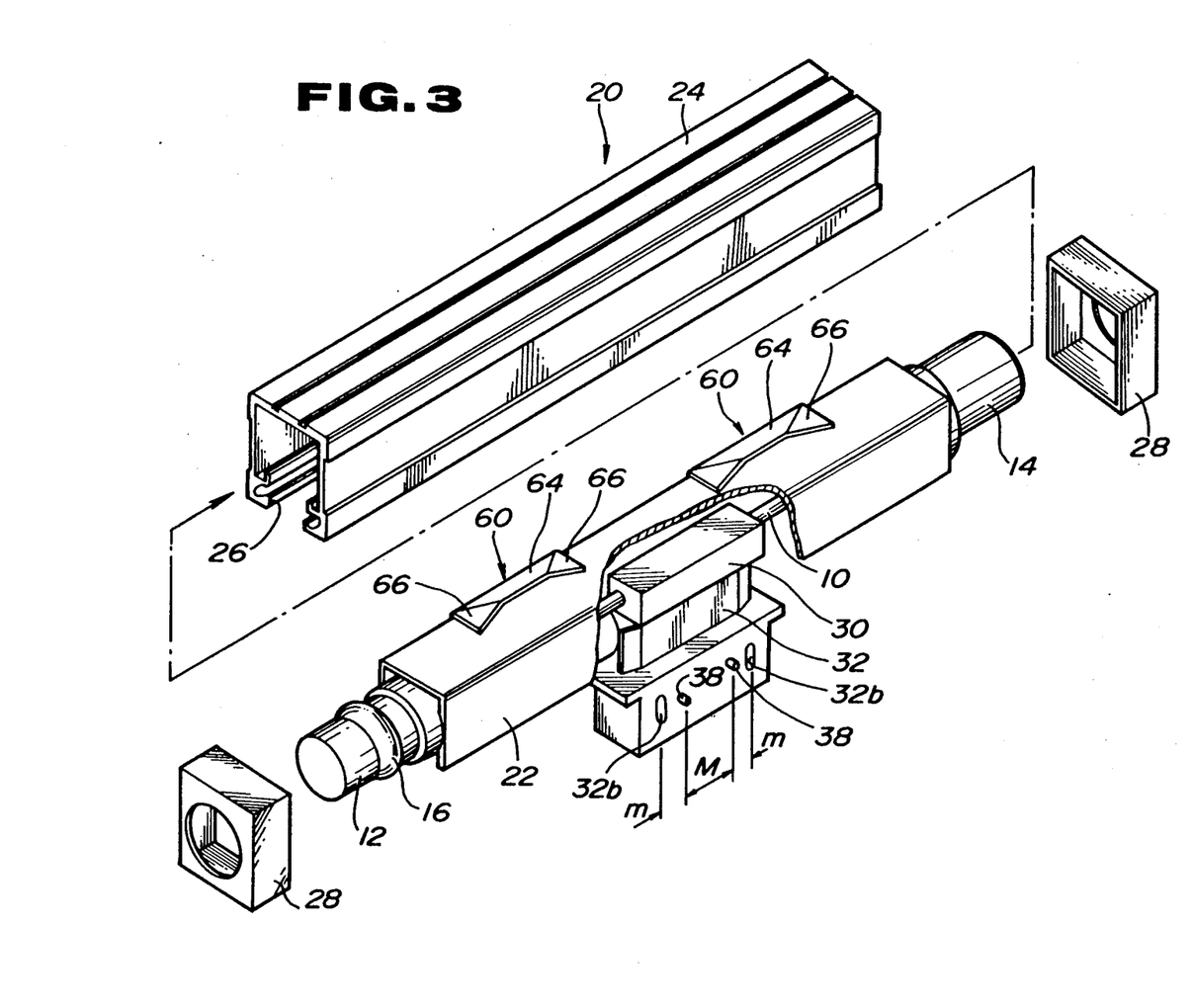
FIG. 3 is an exploded perspective view of the linear scale of FIG. 1.

Referring now to the drawings, particularly to FIGS. 1, 2 and 3, the preferred embodiment of a linear scale arrangement, according to the present according to the present invention, generally comprises a scale 10, a scale channel 20 and a reading head 30. In the shown embodiment, the scale 10 comprises a magnetic scale rod. Though the shown embodiment will be discussed herebelow in terms of magnetic linear scale including a cylindrical rod shaped scale, which will be hereafter referred to as "rod scale", it is not essential for the invention to use the rod scale but can use any appropriate form of magnetic scale. Furthermore, the present invention is applicable not only for the magnetic scale but also for any other type of scales, such as glass scale.

In the shown embodiment, since the magnetic rod scale is employed as the scale 10, the reading head 30 comprises a magnetic reading head for reading scale. As can be naturally appreciated, the reading head is not necessarily the magnetic reading head and can be replaced with any appropriate reading head adapted to the scale used. In the specific embodiment, the scale channel 20 is sectionally square or rectangular shaped hollow box formed with an axially extending slot 26 through which a head slider 32 which is associated with the reading head 30 extends. The scale channel 20 serves for protecting the rod scale 10 from the dust in the environment, and as well serves as a magnetic shield for protecting the rod scale 10 and the reading head from the magnetic noise in the environment. For this purpose, the scale channel 20 comprises an inner magnetically conductive channel 22 which will be hereafter referred to as "inner channel". The scale channel 20 is further comprises an outer ornamental channel 24 which will be hereafter referred to as "outer channel". The outer channel 24 is fitted with end cover 28. In the shown embodiment, the inner channel 22 is formed of a magnetically conductive material, such as steel by way of press or casting. On the other hand, the outer channel 24 is formed of relatively light weight material, such as aluminium. The outer channel 24 is formed through drawing process or extrusion process.

The scale 10 has both ends firmly fixed to essentially cylindrical end members 12 and 14. As can be seen from FIGS. 1 and 3, the end member 12 is formed with a circumferentially extending bulge 16 which is of essentially semisphere shaped configuration. On the other hand, the end member 14 has plane circumferential surface. Both of the end members 12 and 14 are accurately aligned with the rod scale 10 as assembled. Manner of installation of the end members 12 and 14 to both ends of the rod scale has been disclosed in the aforementioned co-pending U.S. patent application Ser. No. 086,537 now U.S. Pat. No. 4,843,729. The manner of installation disclosed in the foregoing U.S. patent application Ser. No. 086,537 now U.S. Pat. No. 4,843,729 will be herein incorporated by reference for the sake of disclosure. The construction in the co-pending U.S. patent application Ser. No. 086,537 now U.S. Pat. No. 4,843,729 is advantageously employed in the preferred embodiment of the magnetic linear scale arrangement for accuracy of concentricity of the the end members 12 and 14 relative to the longitudinal axis of the rod scale 10. However, the construction of the end member is not essentially to the claimed invention and can be modified in various appropriate ways.

The end members 12 and 14 are mounted on one of objects about which the relative position or relative displacement is to be measured. In the shown embodiment, discussion will be made for installation of the linear scale arrangement on a machine tool having a movable table 40 and a saddle 42 As set forth, the linear scale arrangement according to the invention is not specified to measure the relative position or relative displacement between the movable table and saddle of the machine tool but can be applied for any apparatus, device or equipment which requires substantially high accuracy measurement by means of the linear scale. Therefore, application herein discussed should be appreciated as mere example for facilitating better and clear understanding of the invention. Furthermore, though the shown example mounts the rod scale 10 on the movable table of the machine tool and a mounting bracket 34 which is connected to the reading head 30 via the head slider 32 is fixed to the saddle of the machine tool, the arrangement of the rod scale and the mounting block can be alternated if desired.

Mount blocks 50 and 52 are provided for mounting and securing the end members 12 and 14 of the rod scale 10 onto the movable table. The mount block 50 generally comprises a plate formed with an axially extending groove 50a in order to receive therein the end member 12. Projections (not shown) are formed on the bottom of the groove 50a in opposition of the semisphere bulge 16. In the practical embodiment, three projections are arranged in triangular orientations so as to define triangularly arranged three contact points to the bulge 16. A fixture 54 is fitted onto the outer periphery of the end member 12 at the orientation where the bulge 16 is formed so as to fix the end member 12 onto the mount block 50 with maintaining three points contact between the bulge and the projections.

The mount block 52 is also formed with an axially extending groove 52a in order to receive therein the end member 14. The groove 52a is formed into an essentially rectangular configuration in cross section and is formed with projections (not shown) projecting from the bottom of the groove. Practically, the mount block 52 is provided a pair of projections which are arranged in lateral alignment. The projections contacts with the outer periphery of the end member 14 to establish point contact at two laterally offset orientation. The end member 14 is firmly fitted within the mount block 52 by means of a fixture 56. As can be seen from FIGS. 1 and 5, the fixture 56 is formed with a projection 56a projecting toward the mating surface of the periphery of the end member 14 The projection 56a is cooperative with the projections of the mount block 52 to establish three point engagement. The construction establishing three points contact between the end member and the mount block has also been disclosed in aforementioned copending U.S. patent application Ser. No. 086,537 now U.S. Pat. No. 4,843,729.

Figure 4:
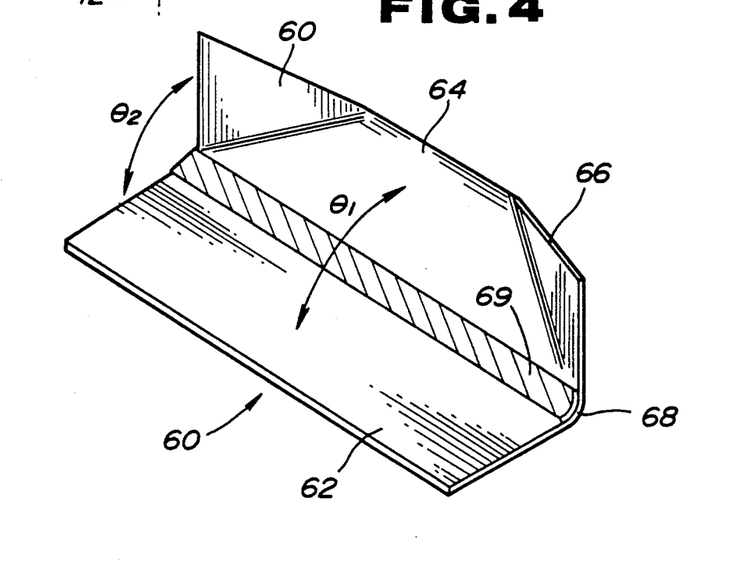
FIG. 4 is a perspective view of a spring member employed in the preferred embodiment of the linear scale of FIGS. 1 through 3.

Leaf springs 60 are disposed between the inner and outer channels 22 and 24. As shwon in FIG. 4, each of the leaf spring 60 is bent in order to be form essentially L-shaped configuration. The bent leaf spring 60 has a vertically extending section 62 and a horizontally extending section 64. Both longitudinal end portions 66 are downwardly bend to form resilient contact strips. The angle $\theta_1$ formed by the center portions of the vertically extending section 62 and the horizontally extending section is set approximately 135°. On the other hand, at the axial end, the angle $\theta_2$ formed between the vertically extending section 62 and the horizontally extending section 64 is set approximately 90°. The leaf spring 60 further has an intersecting corner 68 between the vertically extending section 62 and the horizontally extending section 64. On the inner side surface of the intersecting corner 68 of the leaf spring 60, a both side adhesive tape 69 is fitted.

As can be clearly seen from FIGS. 2 and 3, the leaf springs 60 are fitted onto the upper left side corner of the inner channel 22. The leaf spring 60 is firmly fitted onto the upper left side corner by means of the both side adhesive tape 69 in a manner clearly shown in FIG. 2. As can be seen from FIG. 2, the lower end portion of the vertically extending section 62 is resiliently contact with the vertical wall section of the outer channel 24 so as to bias the outer channel. Also, the bent end sections 66 are in contact with the inner periphery of the upper wall section to bias the outer channel in upward direction. Therefore, the channel 24 is biased in up left direction to be firmly fitted the front wall of inner channel. As a result, play between the inner and outer channels 22 and 24 can be removed by orienting the pre-assembly of the rod scale off centered from the center of the outer scale channel. By the effect of the leaf spring 60, the relative position between the inner channel 22 and the outer channel 24 can be fixed to each other.

Upon assembling of the inner and outer channels 22 and 24, the leaf springs 60 are fitted onto the outer periphery of the inner channel 22. At this time, since the bent angle $\theta_2$ at both axial ends re set to 90°. Therefore, firm fitting of the leaf springs 60 onto the inner channel 22 can be easily obtained. After fitting the leaf spring 60, the outer channel 24 is assembled to the inner channel 22 with establishing resilient engagement with the leaf springs 60 in a manner as shown in FIG. 2.

The outer channel 24 is formed with embossed or pressed projections 24a and 24b which are projecting outwardly. A pair of pressed projections 24a are formed on the vertically extending front wall of the outer channel. On the other hand, a pair of pressed projections 24b are projected from the upper horizontal wall of the scale channel. The pressed projections 24a have tip end planes 25a extending on the same vertical plane which vertical plane is holding accurate parallerism with the axis of the rod scale 10. Similarly, the pair of pressed projections 24b have tip end planes 25b extending on the same horizontal plane which horizontal plane lines in parallel to the axis of the rod scale 10. These vertical plane and the horizontal plane serve as reference planes for installation of the rod scale 10 with the scale channel 20 on the movable table 40 of the machine tool.

In order to adjust the height position of the tip end planes 25a of the pressed projections 24a, the pressured projection is initially formed at a height higher than the height than the finally or planed height. Machining is performed for adjusting the height level of the tip end planes 25a so that both tip end planes of the projections can be aligned on the vertical reference plane. Similarly, in order to adjust the height position of the tip end planes 25b of the pressed projections 24b, the pressured projection is initially formed at a height higher than the finally or planed height. Machining is performed for adjusting the height level of the tip end planes 25b so that both tip end planes of the projections can be aligned on the horizontal reference plane. Therefore, these pressed projections 24a and 24b can serve as alignment marks for accurately installing the rod scale 10 and the scale channel with accurately maintaining parallelism with the axis of the motion of the movable table relative to the saddle 42 of the machine tool.

Figure 5:
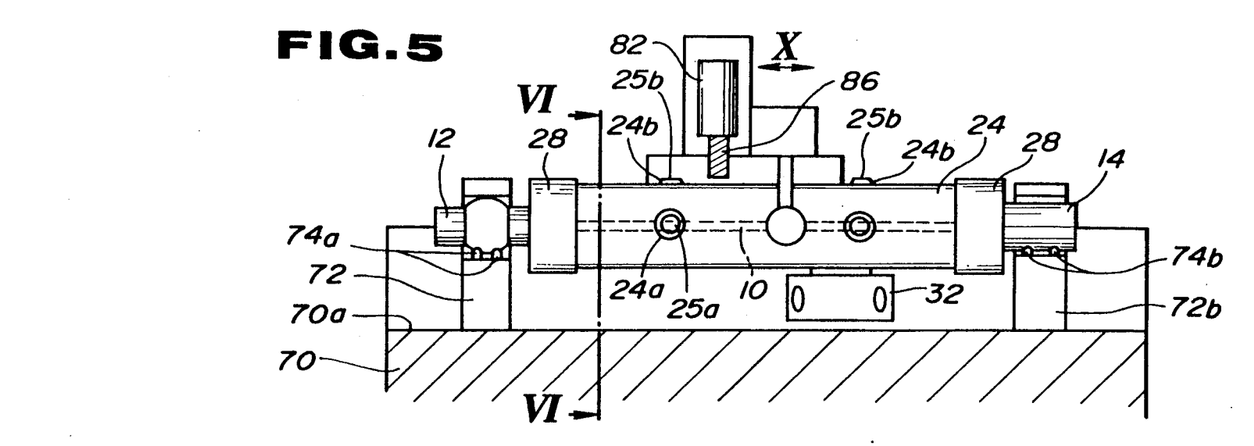
Figure 6:
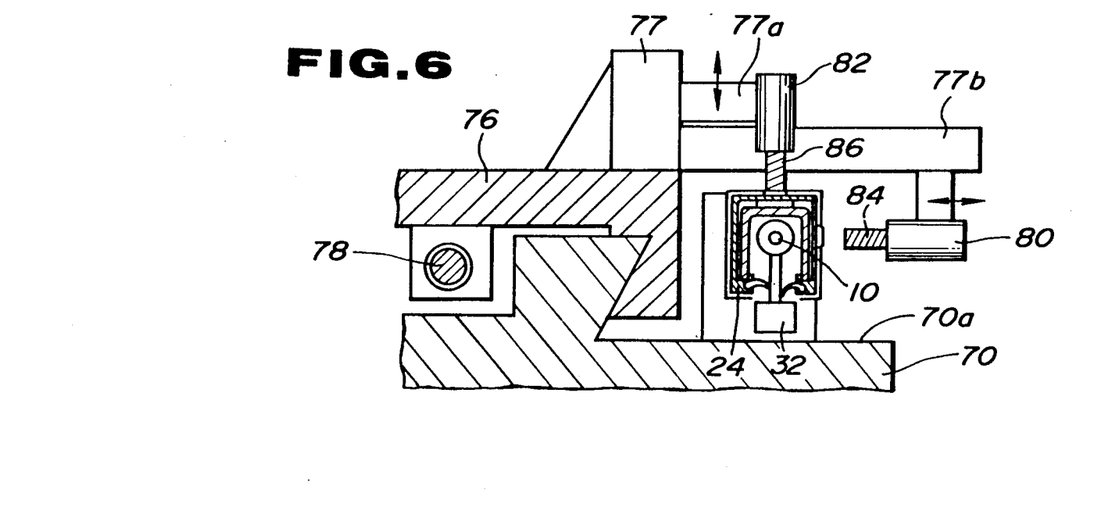

One of the practical process of machining the projection to align the tip end planes 25a and 25b on the reference planes will be discussed with reference to FIGS. 5 and 6. In order to perform machining, a machine tool as shown in FIGS. 5 and 6 can be used. The machine tool has a base 70 having a surface 70a defining a reference plane. A pair of jigs 72a and 72b are mounted for securing the end members 12 and 14 with maintaining the axis of the rod scale 10 in parallel relationship with the surface 70a of the base 70. The jigs 72a and 72b have projections 74a and 74b respectively corresponding to those formed on the mount blocks 50 and 52. The machine tool has a machining table 76 which can be driven in a direction shown by arrow x by means of ball screw 78. The machining table 76 carries a y-axis machining head 80 and a z-axis machining head 82. The machining heads 80 and 82 are mounted on the machining table 76 by means of a support 77 and support arms 77a and 77b. The y-axis machining head 80 has an end mill 84 which is movable in a direction shown by arrow y. Similarly, the z-axis machining tool 82 has an end mill 86 movable in a direction shown by arrow z. Height of the end mill 86 is so adjusted that it is oriented at lower elevation than the initial tip end of the projections 24b. At this position, the end mill 86 is driven at high speed and is shifted in x-axis direction. Similarly, the end mill 82 of the y-axis machining head 84 is oriented at a position closer to the general surface of the outer channel 24 than the initial tip end of the projections 24a. At this condition, the end mill 84 is driven at high speed and is shifted in x-axis direction with the movable table 76. Since the movable table 76 can be drive to shift the end mills 84 and 86 with maintaining high accuracy parallelism with the reference surface 70a. The machined tip end surfaces 25a and 25b of the projections 24a and 25b can be aligned on the reference planes which are parallel to the axis of the rod scale 10.

The rod scale 10, the scale channel 20 as an assembly of the inner and outer channels 22 and 24 are installed on the movable table in a form of assembly. The parallelism of the axis of the rod scale 10 is adjusted by means of a measuring tool, such as dial gauge so that the vertical and horizontal reference planes respective extending through the tip end planes 25a and 25b of the pressed projections 24a and 24b lie in parallel to the axis of movement of the movable table 40 of the machining tool. Manner of fine adjustment as permitted by three points contact between the end members 14 and 16 and the mount blocks 50 and 52 has also been disclosed in the aforementioned co-pending U.S. patent application Ser. No. 086,537 now U.S. Pat. No. 4,843,729. The relevant portion of the disclosure of the co-pending U.S. patent application Ser. No. 086,537 now U.S. Pat. No. 4,843,729 in touch with this aspect will be herein incorporated by reference for the sake of disclosure.

As set forth, the reading head 30 has the integrally formed head slider 32. The head slider 32 extends through the slot 22. In order to protect the internal space of the scale channel 20, a pair of sealing lips 28a and 28b are provided at both lower ends of the outer channel 24. The sealing lips 28a and 28b are formed of elastic material and have contacting lips 29a and 29b which sealingly contact with each other and can be elastically deformed to permit the reading head 30 and the head slider 32 along the axis of the rod scale 10.

The head slider 32 is connected to the saddle 42 of the machine tool via the mounting bracket 34. As can be appreciated by comparing FIGS. 1 and 2, the number of mounting bracket 34 can be variable depending upon the manner of mounting of the linear scale arrangement. The head slider 32 is formed with a pair of through openings 36 through which a positioning pins 38 extends. The positioning pins 38 are extended toward the mounting bracket 34 and received in a through opening 34a for determining the relative position between the head slider 32 and the mounting bracket 34. At an axially off-set position, fastening bolts 32a extends to the mounting bracket 34 to rigidly connect the head slider 32 and the mounting bracket 34.

Figure 7:
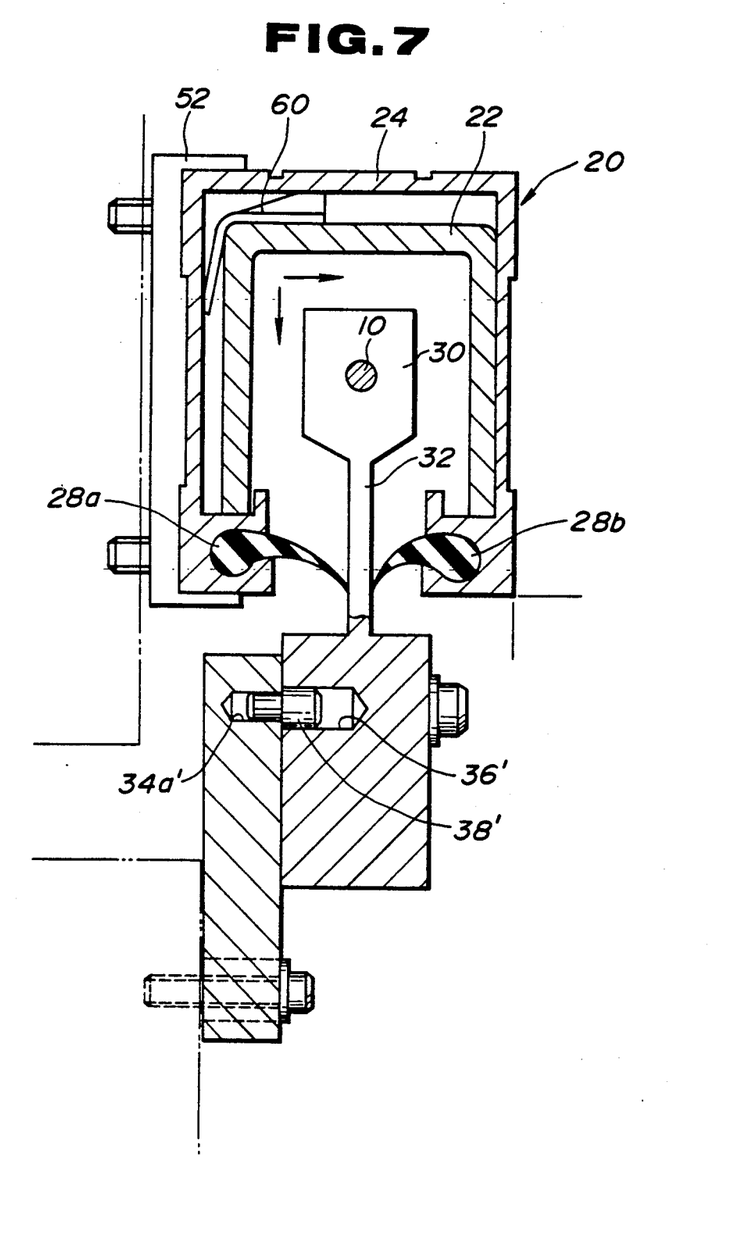
FIG. 7 is an enlarged section showing manner of installation of a head carrier for the other object.

Though the shown embodiment employs through openings formed through the head slider 32 and the mounting bracket 34 for permitting the positioning pin 38 to pass therethrough, it may also possible to use a baried pin 38' installed in a pin receptacle recess 36' as shown in FIG. 7. In such case, the through opening in the head slider in the shown embodiment may be replaced with a blind hole 34a'.

With the foregoing construction, the mounting bracket 34 is connected to the head slider 32 at a orientation downwardly off-set from the lower end edge of the outer channel 24 in a dimension $L_1$. On the other hand, the front end surface 34b of the mounting bracket 34 is laterally oriented with respect to the reference plane PB defined on the front surface of the outer channel 24 in a position laterally off-set therefrom in a magnitude of $L_2$.

As shown in FIG. 3, the head slider 32 is formed with vertically elongated openings 32b are formed in order to receive the fastening bolts 32a therethrough. The axial distance between the positioning pin 38 and the elongated opening 32b is set at m and the distance between the positioning pins 38 is set at M. Corresponding to this, the mounting bracket 34 is formed with the positioning pin receptacle opening 34a and threaded openings 34b. The distance between the positioning pin receptacle opening 34a and the threaded opening 34b is set at m and the distance between the positioning pin receptacle openings 34a is set at M. The elongated openings 32b formed through the head slider 32 permits fine adjustment of the relative position of the head slider 32 and the mounting bracket 34. The manner of fine adjustment utilizing such combination of the elongated opening and the fastening bolt as that set out hereabove has been disclosed in U.S. Pat. No. 4,649,648, to Kazuo Nagaoka et al, and assigned to the common assignee to the present invention. The disclosure of this U.S. Pat. No. 4,649,648 is herein incorporated by reference for the sake of the disclosure.

In order to perform accurate measurement of the relative position or relative displacement between the movable table 40 and the saddle 42 of the machine tool, the mounting bracket 34 has to be secured onto the saddle 42 with holding parallelism with the motion axis of the movable table. In accordance with the present invention, since the rod scale 10 is accurately mounted on the movable table 40 with maintaining parallerism with the motion axis of the movable table, the position of the mounting bracket 34 is generally determined with respect to the axis of the rod scale 10. As set out, since the rod scale 10 as installed on the movable table 40 in a form of pre-assembly covered by the scale channel 20 is not externally accessible, practical positioning of the mounting bracket 34 is determined by utilizing reference plane PB and PA formed on the outer surface of the outer channel 24.

Figure 8:
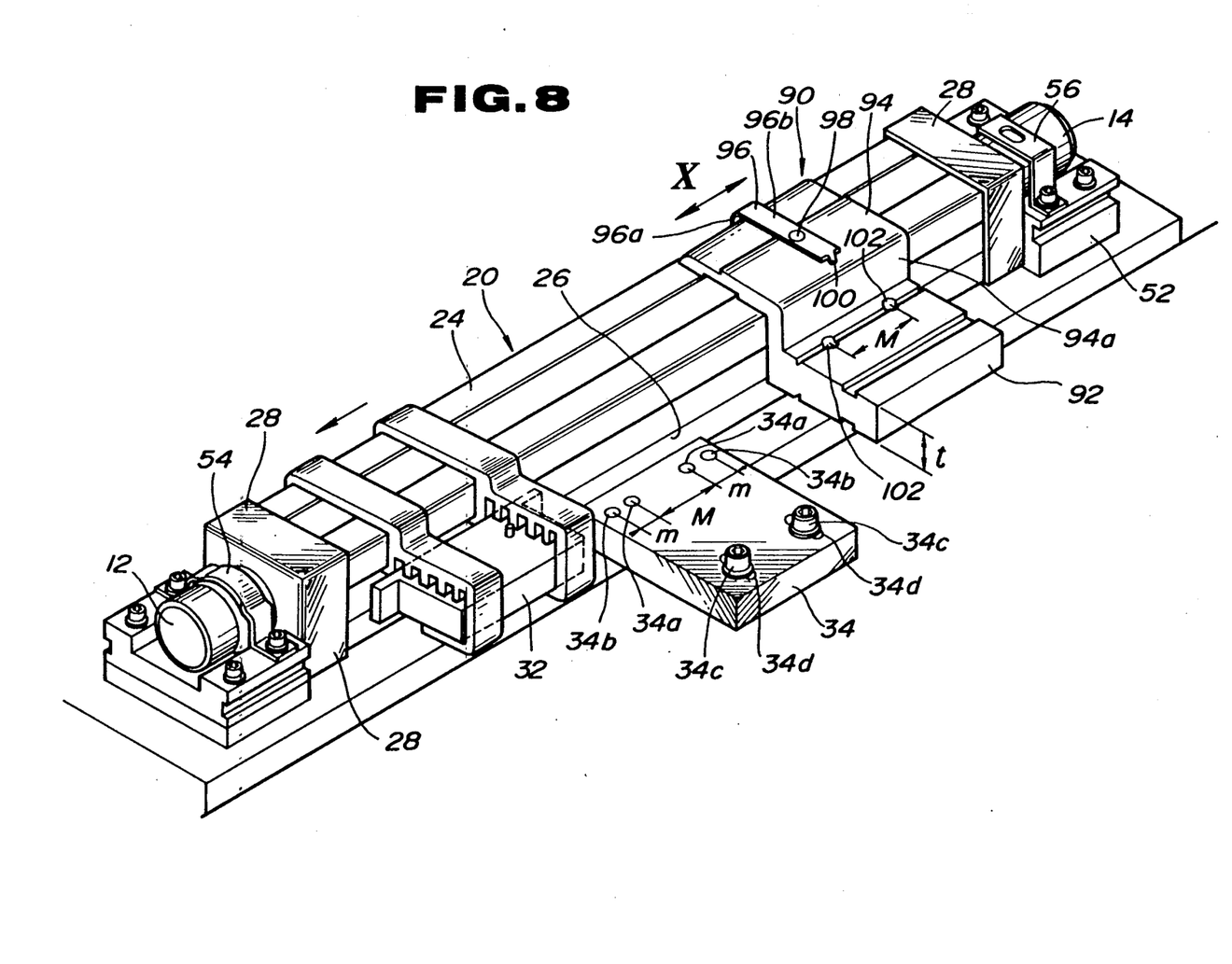
FIG. 8 is a perspective view of the preferred embodiment of the linear scale, and showing manner of installation of the head carrier to the other object.
Figure 9:
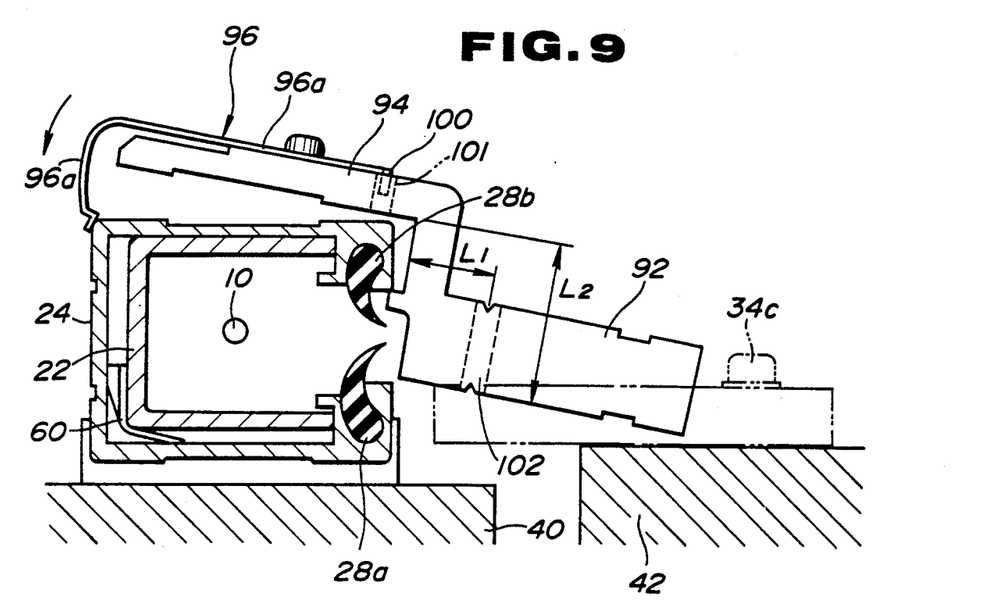
FIGS. 9 and 10 are section showing manner of positioning of positioning of a mounting bracket for the head carrier.

In order to enable positioning of the mounting bracket 34, a positioning jig 90 is used. The jig 90 serves as dummy of the head slider 32 during installation of the mounting bracket 34 onto the desired position of the saddle 42. In order to conveniently perform positioning of the mounting bracket 34, the positioning jig 90 is so constructed as to releasably mounted on the scale channel 20. As shown in FIGS. 8 and 9, the positioning jig 90 comprises a section 92 serving as a dummy of the head slider 32. The section 92 serving as the dummy of the head slider will be hereafter referred to as "dummy slider section". The dummy slider section is integrally formed with an essentially L-shaped section 94 which extends over the front vertical section which is illustrated as being horizontally lying in FIGS. 8 and 9 and the lower horizontal section which is illustrated as vertically extending in FIGS. 8 and 9. The section 94 will be hereafter referred to as "retainer section". The vertically extending portion 94a of the retainer section has a height so determined as to place the dummy slider section 92 at the position substantially corresponding to the position of the head slider 32.

An essentially L-shaped spring 96 is secured to the vertically extending portion 94b of the retainer section 94 and extends rearwardly to place the horizontally extending section 96a thereof in opposition to the upper horizontal surface of the outer channel 24. The L-shaped spring 96 is secured to the vertically extending portion 94b of the retainer section 94 by means of a fastening screw 98. The spring 96 has a strip form tip end 100 engaged to the through hole 101 formed in the vertically extending portion 94b of the retainer section 94. As shown, the spring 96 has an end 96c is bent to form an engaging claw. The engaging claw 96c is so oriented to engage with an axially extending ornamental groove 24c formed on the upper horizontal section of the outer channel 24, remote from the horizontally extending portion 94b of the retainer section 94. The spring 96 resiliently urges the jig 90 onto the reference planes defined on the outer channel 24 in order to position the dummy slider section 92 of the jig 90 relative to the reference planes.

The dummy slider section 92 is formed of a pair of spaced through openings 102 which are formed at orientation substantially corresponding to the position of the positioning pins 38 of the head slider 32. Therefore, the distance between the pair of through openings 102 exectly corresponds to the distance M between the positioning pins 38. On the other hand, the dummy slider section 92 has a thickness t which is determined to be thicker than the head slider 32 in the extend that the surface 92a opposing to the mounting bracket 34 may be placed at the relevant surface of the head slider so as to determine the level of the surface exactly corresponds to that of the head slider 32. As clearly seen from FIG. 9, the dummy slider section 92 has an extension extending upwardly so that it may engage with the lower end edge of the outer channel 24.

Figure 10:
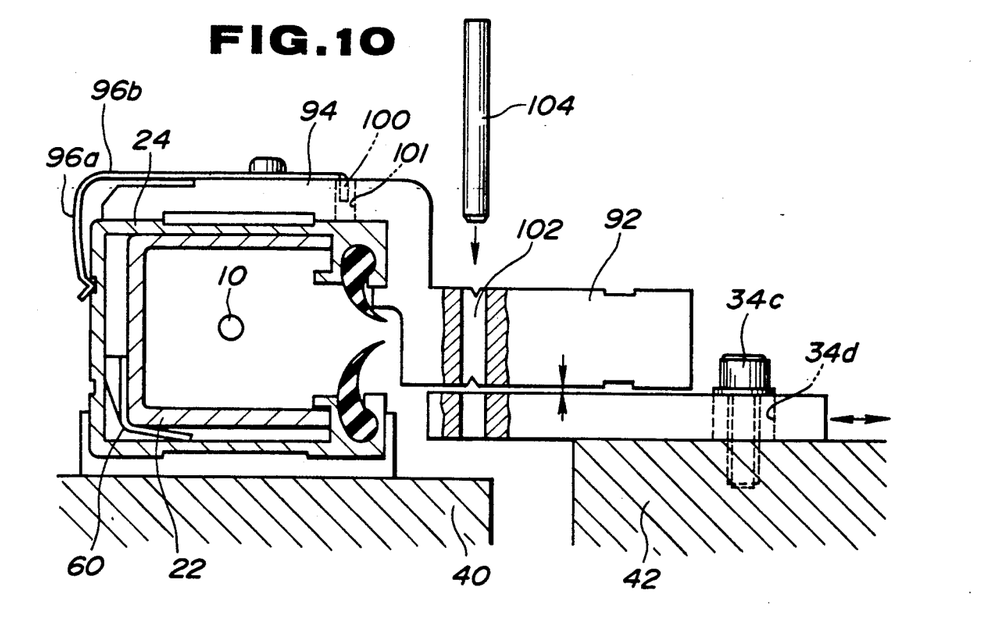
Figure 11:
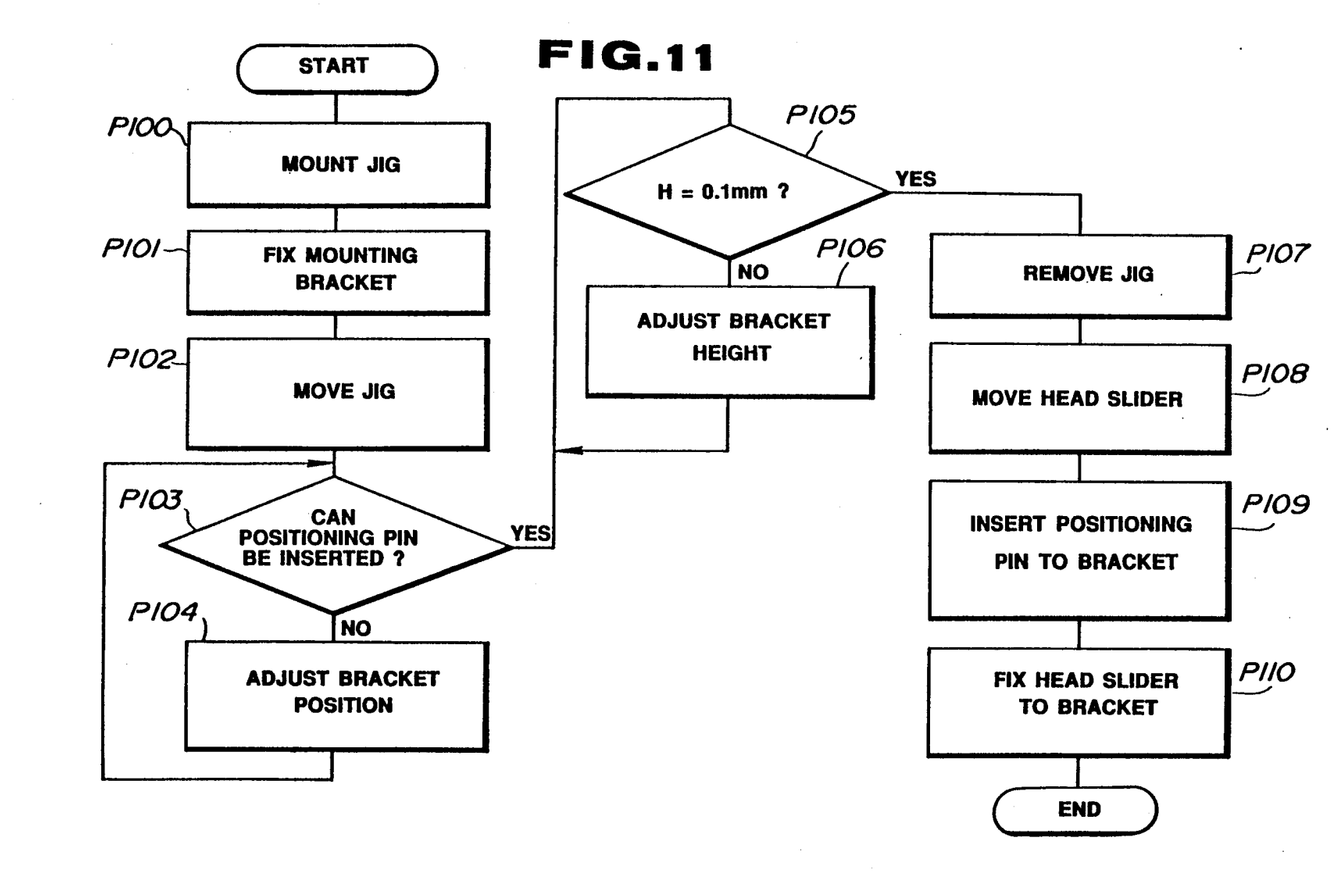
FIG. 11 is a flow chart showing process of installation of the preferred embodiment of the linear scale arrangement.

In the practical installation of the mounting bracket 34 by means of the jig 90 will be discussed herebelow with reference to FIG. 11. At the initial step P100, the jig is engaged to the placed in the position shown in FIG. 10 relative to the outer channel 24. Thereafter, the mounting bracket 34 is temporarily secured onto the saddle at approximately desired position, as illustrated as step P101. Then, at a step P102, the jig 90 is moved to the position approximate connecting position where the mounting bracket is secured. At a step P103, positioning pins 104 pass through the through openings 102 of the jig 90. Then, fine adjustment is performed through steps P103 and P104. During the fine adjustment, the position of the mounting bracket 34 is delicately adjusted by loosing fastening bolts 34c and slightly moving the mounting block in the aid of the elongated opening 34d at the step P104. Then, at the step P103, check is again performed whether the positioning pin can be inserted through the positioning opening 34a. The position of the mounting bracket 34 is thus adjusted so that the positioning openings 34a receives the positioning pins 104 by repeating the steps P103 and P104. Then, height level of the mounting bracket 34 is checked and so adjusted by means of a spacer or so forth as to place the surface to mate with the head slider 32 in a orientation opposing the associated surface of the dummy slider section 92 with maintaining a substantially small gap H through steps P105 and P106. Practically the gap H between the opposing surfaces is approximately 1 mm by repeating the steps P105 and P106. At the end of adjustment of the position, the mounting bracket 34 is rigidly secured onto the saddle 42 by means of fastening bolts 34c which passes through elongated openings 34d formed through the mounting bracket. After completing adjustment, the dummy slider 90 is removed from the scale channel 20 at a step P107. Thereafter, the head slider 32 is moved to the position where the mounting bracket 34 is oriented, at a step P108. At this position, the positioning pin 38 of the head slider 32 is inserted the positioning opening of the mounting bracket 34 at a step P109. Thereafter and finally, the mounting bracket 34 and the head slider 32 is connected.

Figures 12, 13:
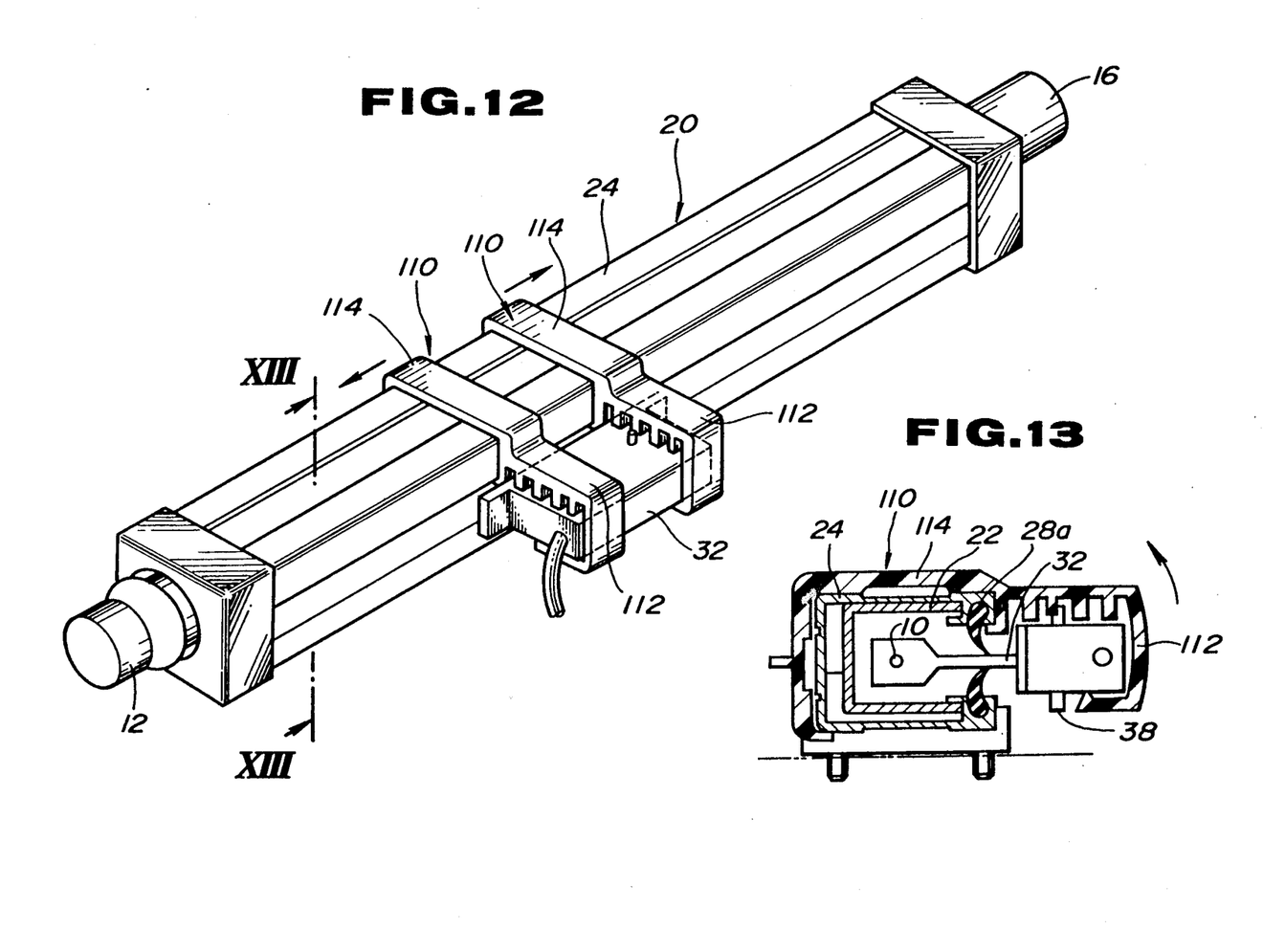
FIG. 12 is a perspective view of the linear scale arrangement with a head carrier retainer.
FIG. 13 is a section taken along line XIII—XIII of FIG. 12.

During adjustment set forth above, it is preferable to maintain the head slider 32 at a position which is not interfering. For this purpose, holder 110 is used. The holder 110 is integrally formed of a material which permits resilient or elastic deformation, such as a synthetic resin and configured as shown in FIGS. 8, 12 and 13. The holder 110 has a head gripper section 112 to engage with the head slider 32 and a retainer section 114 to engage with the outer channel 24. In order to resiliently hold the outer channel 24, the retainer section 114 is provided a hooked end engaging with one corner of the outer channel 24 for resiliently or elastically urging the retainer section 114 onto the outer channel in order to steadily hold the head slider 32. Both of the head gripper section 112 and the retainer section 114 are so designed as to resiliently engage with respectively associated head slider 32 and the outer channel 24 for temporarily retaining the the head slider in place.

The holder 110 is also useful during transportation of the scale channel in a form, to which the head assembly including the reading head 10 and the head slider 32 are assembled. During transportation, the head slider 32 is maintained as shown in FIG. 12.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A scale arrangement for monitoring relative displacement between first and second members, comprising:
    an elongated scale having end portions at both ends thereof;
    a pair of receptacles respectively receiving said end portions, said pair of receptacles adapted to be mounted on an associated one of said first and second members;
    a hollow member, having a reference plane defined thereon, receiving said scale therein;
    a head slidingly mounted on said scale for axial movement therealong for reading the scale and to generate a read scale indicative signal;
    a head slider associated with said head for axial movement with said head, said slider adapted to be mounted on an associated other one of said first and second members;
    said elongated scale being positioned in said hollow member parallel to said reference plane;
    wherein said reference plane is used to determine the relative positions of said end portions of said scale on said one associated one of said first and second members and the position of said head slider on the other associated one of said first and second members to ensure that said head and scale are in parallel alignment.

2. A scale arrangement as set forth in claim 1, wherein said hollow member comprises an inner and outer members respectively having essentially quadrate cross-section, said inner sectionally quadrate members has an outer periphery opposing to the inner periphery of said outer quadrate member, a bias means is provided between said inner and outer members for biasing said outer member away from said inner member for forming said reference plane on said outer member.

3. A scale arrangement as set forth in claim 2, wherein said bias means comprises a leaf spring acting on one corner of said inner member for exerting biasing forces in mutually perpendicular two directions toward said outer member.

4. A scale arrangement as set forth in claim 1, wherein said hollow member is formed with a plurality of longitudinally aligned projections, the tip ends of said projections defining said reference plane.

5. A scale arrangement as set forth in claim 1, which further comprises a jig which is releasably mounted on said hollow member and resiliently biased toward said reference plane, said jig being movable in longitudinal direction, and a connecting member for connecting said head slider to the other associated one of said first and second members, which connecting member is positioned with respect to said jig.

6. A scale arrangement as set forth in claim 1, wherein said head slider is formed with one of projection and recess, a connection member for connecting said head slider the other associated one of said first and second members, which connecting member is formed with one of recess and projection conforming with said one of projection and recess formed in said head slider, and a jig which is resiliently biased onto said reference plane on said hollow member, by means of which the position of said connecting member on the other associated one of said first and second member is determined.

7. A scale arrangement as set forth in claim 1, which further comprises a head slider holder which comprises a positioning section to be attached onto said hollow member, a hooking section for biasing said positioning section to said hollow member and connected to said positioning section by a web portion made of a flexible material, and a holder section for holding said head slider.

8. A scale arrangement as set forth in claim 7, wherein said positioning section, a hooking section and holder section are formed integrally of a flexible material.

* * * * *